Dec. 14, 1965   R. L. HOLLOWAY ETAL   3,223,572
MACHINE FOR BUILDING A TREAD ON PNEUMATIC TIRES
Filed Dec. 24, 1959   8 Sheets-Sheet 2

INVENTORS
ROBERT L. HOLLOWAY
JOSEPH A. GROM
BY
Nicholas T Volan
ATTORNEY.

INVENTORS
ROBERT L. HOLLOWAY
JOSEPH A. GROM
BY
Nicholas T. Volex
ATTORNEY

Dec. 14, 1965   R. L. HOLLOWAY ETAL   3,223,572
MACHINE FOR BUILDING A TREAD ON PNEUMATIC TIRES
Filed Dec. 24, 1959   8 Sheets-Sheet 8

INVENTORS
ROBERT L. HOLLOWAY
JOSEPH A. GROM
BY
Nicholas T. Vohr
ATTORNEY

United States Patent Office 3,223,572
Patented Dec. 14, 1965

3,223,572
MACHINE FOR BUILDING A TREAD ON PNEUMATIC TIRES
Robert L. Holloway, Snyder, and Joseph A. Grom, Tonawanda, N.Y., assignors to American Machine & Foundry Company, a corporation of New Jersey
Filed Dec. 24, 1959, Ser. No. 861,961
27 Claims. (Cl. 156—394)

This invention relates to a machine for applying a strip or a ribbon of pliable material, such as either natural or synthetic rubber, or a combination of the two, to a vehicular pneumatic tire for retreading used pneumatic tires.

Pneumatic tires are now retreaded, or recapped, by first buffing the tire on a buffer and then applying a band properly shaped unvulcanized rubber stock known as "camelback," to the buffed surface. The word "camelback" was applied to an extruded, relatively wide length of uncured rubber having one flat surface, or the base, and in some types two humped prominences on the opposite side, resembling the two humps of a camel. The cross-section of such material is controlled by the shape of the opening in the extrusion die.

The "camelback" is "stitched," i.e., initially adhered to the buffed surface through the natural stickiness of its undersurface and then vulcanized in a mold, also of proper size, the mold being provided with a removable matrix. The matrix has a tread pattern which imprints this tread pattern to the camelback in the course of the vulcanizing step of the process. The camelback is furnished by a manufacturer who extrudes the uncured rubber through a die, thus imparting to the extruded ribbon-like slab a fixed dimension and shape which corresponds to the size of the tire and shape of the mold's matrices that are used in the recapping operation of the tires of various sizes. Since camelback is preformed by extruding rubber stock through a die, it must be made up in various widths, thicknesses and shapes (various cross-sectional dimensions) in order to conform to the requirements of tires of different sizes and types, and the type of buffing performed on the tire prior to the actual recapping operation. As there are a large number of tire sizes, a large number of different sizes of camelback are manufactured to meet the requirements of the trade.

The recapping shops usually conduct their business at the present time as follows: The recapper decides on the type of tires that he wishes to recap, such as passenger car tires, sports car tires, truck tires, grader tires, heavy earth-moving equipment tires, landing gear aircraft tires, etc. Molds of the proper size are then bought and for each mold a number of matrices are bought. The matrices provide a variation in the outside diameter and cross-sectional width of the tire that can be fitted into the mold. Whenever the recapper recaps the tires, he must take into consideration the outside diameter of the buffed tire and its cross-section and then select a proper matrix which would enable him to recap this tire in such a manner that, after the camelback has been stitched onto the buffed tire, inserted into the matrix and then expanded by applying an air pressure, then the camelback will completely fill the entire gap between the matrix and the buffed tire. It is a matter of utmost importance that the camelback completely fills this gap without leaving any voids either between the matrix and the camelback or between the camelback and the outer surface of the tire. It will be obvious that any such voids deleteriously effect the quality of the finished tire.

The recapper must thus have a variety of camelback stock of different shapes and sizes so as to match the variations in sizes of tires. The variations in the dimensions arise due to lack of control of such dimensions in the course of manufacture, "growth" of the tire during use, and uneven wear caused by misalignment of the wheels, improper inflation, etc. From the above, it follows that proper buffing of the tires for obtaining a proper surface and also for obtaining the proper size, or the proper outside diameter of the tire, and the proper contour of the buffed surface, plays an important part for obtaining proper recapping of the tire. This is so because it is only when all of the above factors are accommodated that it is possible to obtain proper tread pattern and the depth of the tread, proper filling of the space between the buffed surface and the matrix and establishment of proper bond in the course of subsequent vulcanizing of camelback to the buffed surface.

The capital investment in the large stocks of camelback can be very substantial. Further, the shelf life of uncured rubber is limited.

According to the invention, a relatively thin ribbon of natural or synthetic rubber, or a combination of both, mounted on an appropriate backing, is wound at a predetermined and controllable rate, preferably in a "relaxed" condition, i.e., without any stretching at the time of the application of the ribbon to the carcass, on the previously properly buffed, inflated carcass in accordance with a predetermined winding pattern. The free end of the ribbon is secured in a suitable manner, as by pressure, to a predetermined point on the carcass, and the winding is continued until the proper amount of uncured rubber, in terms of thickness and the shape or pattern of the applied layer, has been applied to the buffed surface of the tire. Thus the tire being retreaded can be built up to any desired extent to fill properly and completely the space between the inner surface of the matrix and the outer buffed surface of the carcass. Thus there is produced a tread of proper depth to insure a proper molding and adhesion of the cured retread to the carcass after the carcass is expanded by inflating to a suitable pressure and then cured in the mold.

The disclosed machine does not eliminate the necessity of having the usual number of molds and matrices insertable into the molds, but it does eliminate the necessity of having a large inventory of various die sizes of camelback. In accordance with the invention in the retreading of the majority of tires, a single size ribbon stock of uncured rubber, preferably mounted on a proper backing, satisfies all of the usual requirements of the retreading industry with the concomitant simple solution of the problem now faced by the manufacturer, the retreader and the consumer. There are some special situations, however, where the ribbon stock will have different dimensions (width and thickness) for highly specialized tires that are used, for example, by the earth-moving industry, but for everyday use in an average retreading shop, a single size ribbon may be sufficient for satisfying all the requirements of such a shop. Shops of this type do not have molds for highly specialized tires anyway and, therefore, a single size ribbon stock would usually suffice.

An additional difficulty that is inherent in the present recapping and retreading methods resides in the fact that it frequently produces unbalanced treads because of the uneven stretching and straining of camelback during the stitching operation and the "bunching" of the camelback at the splice. At the splice, the two ends are joined together as a but or as a scarfed joint. In order to insure an adequate splice, the trailing end of the camelback is made longer than it is called for by the geometry of the joint with the concomitant bulging of the material which is later flattened out by the stitching roller or rollers. Such use of excess material inherently produces unbalance in the end product.

It is therefore an object of this invention to provide a machine for retreading a pneumatic tire in the form of a plurality of windings of pliable ribbon of rubber narrower in width than the transverse dimension of the tread in accordance with a selective or controllable winding pattern wherein the ribbon of rubber is applied to the other periphery of a properly prepared carcass and the winding is continued until an amount of rubber has been applied sufficient to form the final outer contour of the tire when the tread is formed and the tire is vulcanized.

It is a further object of the invention to provide a machine for applying retread rubber on a prepared pneumatic tire in the form of a plurality of overlapped windings or turns of pliable rubber narrower in width than the tread portion of the tire in accordance with a selected or controlled pattern and effecting relative rotary motion between the carcass and a source of supply of rubber ribbon until the desired number of windings thereof has been applied, after which the carcass with the applied tread rubber is placed in a mold for transforming the applied rubber into a tread vulcanized to the tire.

It is, therefore, an object of this invention to provide a machine for applying retread rubber on pneumatic tire carcasses by selectively applying a pliable ribbon of retread rubber in a completely relaxed state, by selectively, or controllably applying to the outer periphery of a properly buffed tire carcass, ready for receiving the winding while the carcass is being rotated, simultaneously stitching the ribbon to the carcass, and continuing the winding operation until the desired outer contour of the layer of retread rubber is obtained, whereupon the applied windings are ready for curing in a mold for transforming the stitched ribbon into a tread vulcanized to the carcass.

An additional object of this invention is to provide a machine of the above type in which the selective application of the ribbon stock to the outer periphery of the carcass is controlled so as to produce the desired final contour which would conform to the dimensional and/or volumetric requirements of the matrix.

Still another object of this invention is to provide a machine for winding a ribbon of pliable material on a tire, said machine being controllable so as to produce a completely symmetrical transverse outer contour of the tire even though the original transverse contour of the tire is asymmetric.

The novel features which are believed to be characteristic of this invention together with further objects and advantages thereof, will be better understood from the accompanying drawings in which several embodiments of the invention are illustrated by way of several examples. It is to be understood, however, that drawings are for the purpose of illustration only and are not intended as a definition of the limits of the invention.

Referring to the drawings.

Since the invention is disclosed by way of an example, in connection with recapping of used tires, before proceeding with the description of the machine and its operation in applying the winding to the tire, it will be helpful to illustrate several typical shapes of used tires that occur in actual practicing of the recapping and also to illustrate the buffing techniques that are applicable to the used tires. The above is illustrated in FIGURES 9, 10 and 11.

Figure 9:
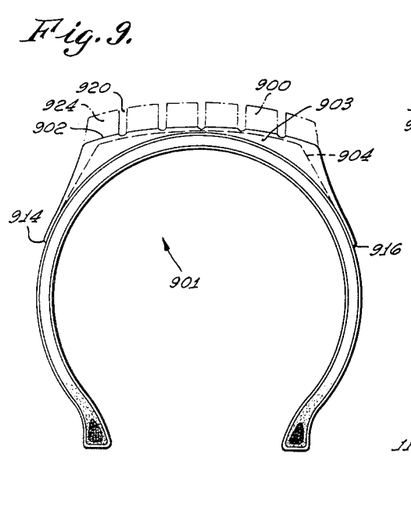
FIGS. 9–11 are transverse sections of used tires with the respective buffing lines being also indicated in these figures.

Referring to FIG. 9, it illustrates the transverse section of a typical tire which originally had tread the extent of which is shown by line 900 constituting an integral part of a tire 901. Line 902 illustrates the outersurface of the tire after it was in use and brought in for recapping. In this case, the wear of the tire was quite even across the tread of the tire and the tire was used only up to that point when the root of the tread still remains slightly visible along the outer periphery of the tire, with the result that the under-tread layer 903 remains intact. Under such circumstances, it is best to buff the tire in the manner indicated by line 904 and, therefore, the completed new winding, produced by the winding of the ribbon, must restore in proper manner that volume and shape of new rubber which is defined by the line 900.

Figure 10:
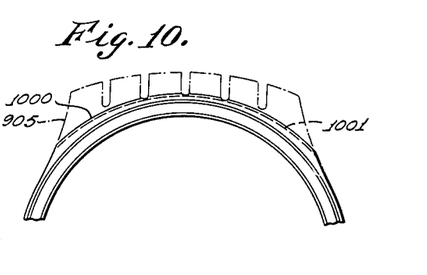

FIG. 10 illustrates more severe wear conditions. The outer periphery of this tire is illustrated by line 1000, which indicates that in this case, the tire shoulders were also subjected to very severe wear, with the result that it becomes necessary to have substantially circular buffing indicated by broken line 1001. Under such conditions, the winding should have a transverse section which is defined by the buffed line 1001 and the original tread, as shown by line 905.

Figure 11:
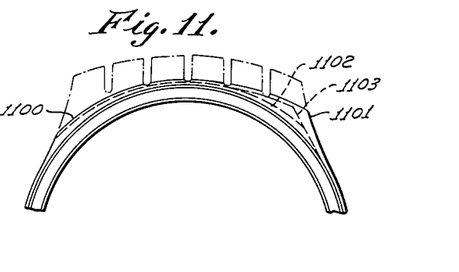

FIG. 11 illustrates still another type of wear which is encountered when the tire is mounted on the front misaligned wheels or when some other improper mechanical conditions arise which produce an asymmetric wear of the tire. In this case, the left shoulder 1100 has been worn off while the right shoulder 1101 still remains on the tire. In the prior art, it has been customary to buff such tires in a manner indicated by a dotted line 1102, which has an approximately circular locus, identical to that illustrated in FIG. 10. The same type of buffing, i.e., that illustrated by line 1102, can also be used in the disclosed method. The advantage of such symmetrical buffing across the entire face of the tire resides in the fact that it becomes much simpler to program the application of the ribbon to the outer surface of the tire because of the symmetry of the resulting winding. However, the disclosed method is sufficiently flexible so as to enable one to buff the tire in the manner indicated by line 1103, which is asymmetric. It thus becomes possible to save the original rubber at the right corner 1101.

Figure 1:
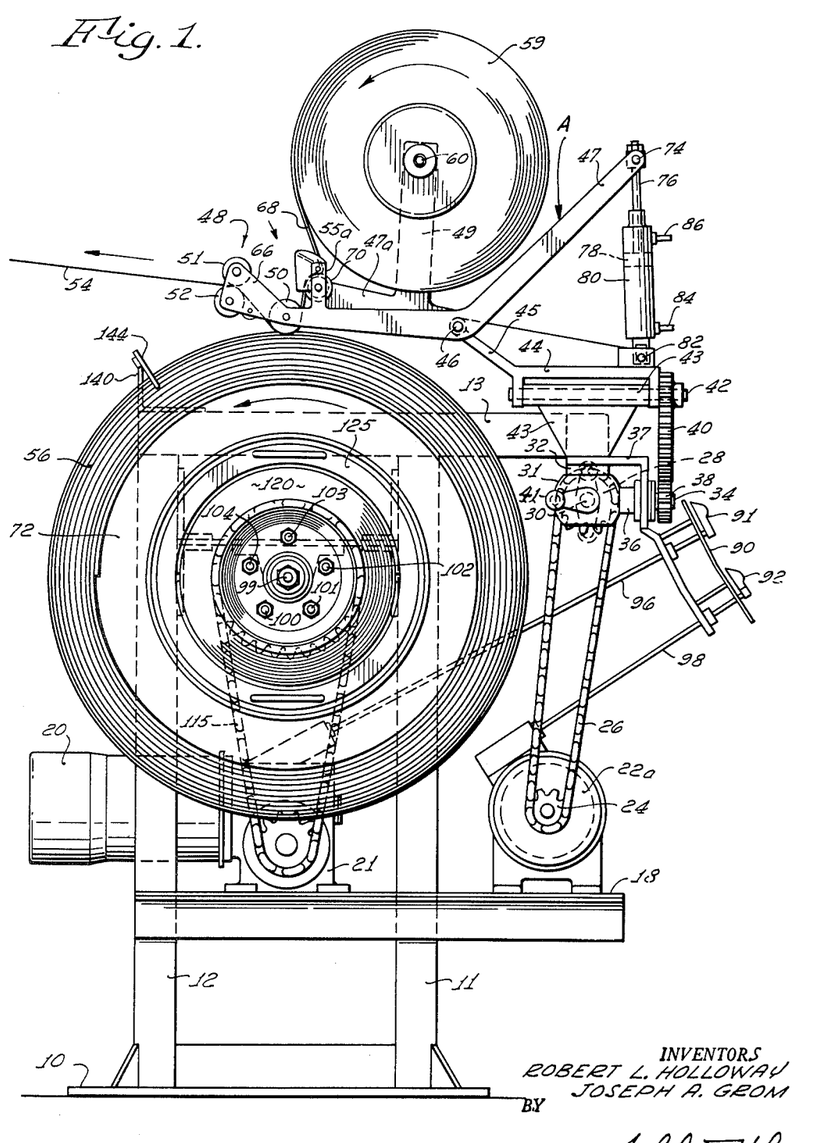
FIG. 1 is a side view of the tread-winding machine.
Figures 1A, 2A, 12, 13, 14:
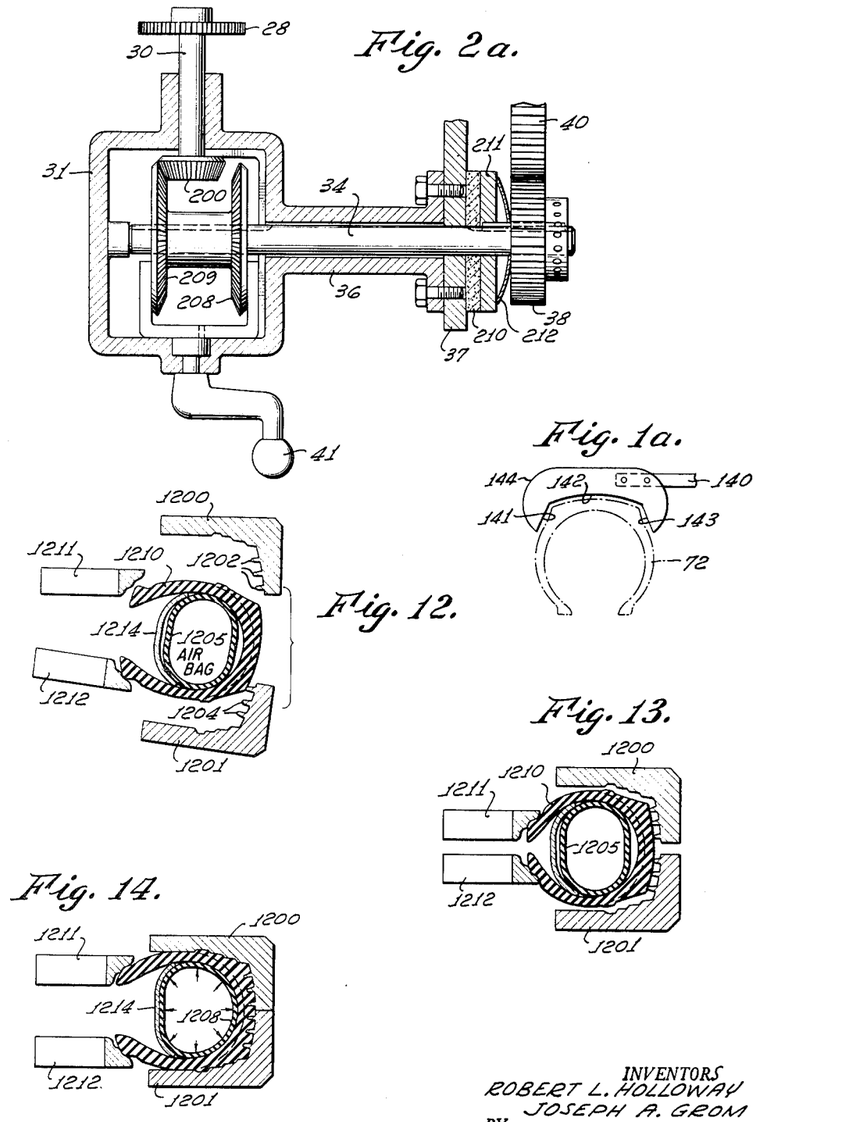
FIG. 1a is a side view of a matrix and a sectional view of a tire with the proper amount of ribbon wound on the carcass.
FIG. 2a is a plan view, partially in sections, of a bevel gear cluster used in the winding machine.
FIGS. 12–14 are transverse sections of a mold matrix and of a tire within the matrix.

FIGURES 12, 13 and 14 illustrate the known method of inserting the tire into a mold matrix to which a proper camelback has been applied either according to the old known methods of recapping or in accordance with the method disclosed here, in which case the camelback is replaced with ribbon. FIGURES 12, 13 and 14 are self-explanatory and need no detailed discussion. They are used here for the sole purpose of demonstrating and illustrating the fact that it is equally important in the old method, as well as in the new method, to have a carcass and camelback, or the carcass and the winding, of such dimensions, and the camelback or the winding of such thickness, so as to produce the tread of proper thickness and with sufficient under-tread layer. From point 914 to point 916 (FIGURE 9) on the recapped tire there is a circular boundary between the new rubber and the old rubber still remaining on the carcass that is being recapped. This under-tread layer is essential for producing proper adhesion for anchoring of the finished, fully vulcanized tread to the carcass. If this under-tread layer is not present, and the inner tread grooves, lines 920, etc., are allowed to project all the way to the buffed surface 904, then the individual tread blocks such as blocks 924, will not adhere in proper manner to the buffed surface 904 of the tire. The boundary lines between the buffed undertread layer 903 and the individual blocks 924 provide the tear points along which separation of the tread might eventually occur.

FIG. 12 illustrates the cross-sectional view of the matrix having the upper portion, 1200, and the lower portion, 1201, which are two circular rings having transverse sections of the type illustrated in FIG. 12. Both rings are being provided with tread pattern projections, 1202 and 1204, which produce the pattern on the tread in the manner illustrated in FIG. 14 when an air bag, 1205, is inflated in the manner illustrated in FIG. 14. FIG. 12 illustrates that postion of the tire and of the two matrices which occur when tire 1210 is being inserted into the matrix and then the matrix is closed upon itself in a manner illustrated in FIGS. 13 and 14.

FIGS. 12 through 14 also illustrate bead aligners, 1211 and 1212, which automatically and properly center the tire within the matrix when it is being closed. Some of the molding apparatus use such centering rings and some of the molding apparatus dispense with them altogether, in which case the centering of the tire within the matrix comes about automatically when the air bag is inflated and tire seeks its own center by virtue of being encased by the matric. FIGS. 12 through 14 also disclose the transverse section of a metallic curing rim, 1214, which generally consists of a plurality of hinged segments for facilitating the insertion of rim into the tire and around the air bag.

Referring to FIGS. 1–6, which illustrate a preferred embodiment of the invention, the machine shown includes frame members 10–18. These frame members are used for supporting the various elements of the machine. The cross-member 18 supports a constant speed electric motor 20 and a gear box 21 used for driving, or rotating, a tire wheel 120 through a chain drive 115. Also mounted on the frame is a reversible motor 22 provided with a variable speed drive 22a, which is used for oscillating back and forth a sector gear 40 and the entire ribbon applying apparatus, designated generally A, illustrated on an enlarged scale in FIG. 3. The oscillation of the ribbon applying apparatus A and of the ribbon roll 59 with its arms 47–47a, and of the ribbon guiding and applying assembly 48, permits a controlled application of the ribbon stock to the outer adjacent surface of a tire 72 so as to wind either one or a plurality of layers of ribbon 56 on the tread-receiving portion of the tire. Such selective and controllable applications of the ribbon produces the ribbon patterns, such as illustrated in FIGS. 15–24 where the transverse sections of these patterns are illustrated. This ribbon-winding mechanism will be described first and it then will be followed with the description of the drive for tire 72 and tire wheel 120.

Proceeding now with the description of the drive and control means for the ribbon-winding and applying apparatus A, motor 22 is provided with a sprocket and chain drive including sprocket 24, chain 26, and sprocket 28 which is mounted on a shaft 30. Shaft 30 is supported by a gear box 31 and a frame bracket 32 connected to the frame member 13. Shaft 30 includes a reversible bevel gear drive mounted in gear box 31 (see FIG. 2a), the driving pinion 200 of the bevel gear being an integral part of shaft 30, while the reversing gear cluster is slidably keyed to and mounted on a shaft 34. Shaft 34 is rotatively mounted in a hub 36 which constitutes an integral part of box 31, box 31 being also supported by a frame bracket 37. Shaft 34 drives a pinion 38, keyed to shaft 34, and pinion 38 meshes with and drives, or oscillates, a sector gear 40 keyed to an axle 42. Therefore, axle 42 revolves, or oscillates, with gear 40. Axle 42 is rotatively mounted in a frame bracket and hub 43. Sector gear 40 is permanently, or non-rotatively, connected to a U-shaped bracket 44 which is rotatively mounted on axle 42. Therefore, the connections between the reversible motor drive 22 and the sector gear 40 is as follows: Reversible drive 22a, sprocket wheel 24, chain 26, sprocket wheel 31, shaft 30; the reversible bevel gear drive mounted in box 31 and hub 36, the reversible bevel gear cluster connected to shaft 34, pinion 38 and sector gear 40. This drive also includes a manually controlled handle 41 for connecting to and disconnecting from gear 200, the two bevel gears 208 and 209 of the cluster and for reversing the direction of rotation of shaft 34 or disconnecting shaft 34 from the gear drive and motor 22. The rotation reversing gear drive 200, 208, 209, 34, 38 also includes a friction clutch including a friction disk 210, a clutch plate 211 and a Belleville spring 212 which connects pinion 38 to the clutch plate 211 and then to the friction disk 210. Friction disk 210 makes a frictional engagement with the frame member 37 on one side and with the clutch plate 211 on the other side. This friction clutch is used to hold the entire applying assembly 48 in proper angular position when it is moved into a slanting position by the sector gear 40. A gravitational pull on assembly 48 otherwise would rotate the assembly until it would strike the frame. This will become more apparent after reading the description of assembly 48.

First, however, it is to be noted that the ribbon roll 59 comprises a composite ribbon 68 formed substantially of an inelastic backing 54 and a substantially uniform ribbon of uncured rubber stock 56. Because of the backing 54, the successive turns of the ribbon stock do not congeal or stick together or lose their shape even after prolonged storage. The rubber stock can thus be supplied to the tire carcass in the dimensions and in the relaxed shape in which it was originally formed or extruded.

Proceeding now with the description of that part of the machine which supplies the ribbon stock from roll 59 and applies this stock to the tire, this apparatus A is mounted on the axle 42 and oscillated by the sector gear 40. In the illustrated embodiment apparatus A includes a roll 50 which adheres or stitches rubber ribbon 56 to the prepared portion of tire 72. Gear 40 is connected to a U-shaped bracket 44 mounted on axle 42. The U-shaped bracket 44 includes a pivot arm 45 having a drilled hole at its projecting end for mounting a pin 46. Pin 46 rotatively interconnects pivot arm 45 with two guide arms 47 and 47a. The guide arms 47, 47a support a ribbon guiding and applying assembly 48 and a reel bracket 49, the latter being an integral part of the guide arm 47a. The ribbon stitching assembly includes a barrel-shaped stitching roller (see FIGS. 3 and 4) and two (2) cover or backing rollers 51 and 52 which strip the backing 54 composite ribbon 68 after it has been stitched to the tire carcass. Since the backing 54 is stripped from composite ribbon 68 after the rubber stock 56 has been stitched to the carcass, all stresses to which the composite ribbon 68 may have been subjected to during the supply and stitching operation are taken up by the backing 54 rather than the rubber stock 56 and therefore the rubber stock 56 is stitched to the tire in its original relaxed state.

Roller 52 preferably is a rubber-covered roller, while roller 51 is a metallic roller, with roller 51 pressing on roller 52. In this manner roller 52 rotates roller 51 when roller 52 is driven by roller 50 through a gear train including gears 53, 53a, 53b and 53c. Rollers 51, 52 assist in stripping and guiding a backing strip 54 from the composite ribbon 68 which, in the form of the invention shown, includes backing 54, such as polyethylene, and unvulcanized rubber ribbon 56, as described in more detail below.

The tread material 56 is adhesively, or adherently, mounted on backing 54. The ribbon may be formed from either a natural or synthetic rubber stock or a combination of synthetic rubber and natural rubber, one of the requirements of ribbon 56 being that it has a reasonably tacky surface for proper adherence, as by tacking, or other suitable manner, to the prepared carcass, and a finite thickness so that when the rubber ribbon is applied in the form of continuous windings upon the prepared portion of the tire, the ribbon adheres to the carcass and also the windings adhere to one another.

In the embodiment of the invention shown in FIGS. 1–5, composite ribbon 68 is mounted in roll form 59 on a reel having a threaded end and a stud 61 attaching hub 60 to the reel supporting arm 49. Roll 59 is rotatively mounted on hollow hub 60a. Arms 47 and 47a are also provided with extension arms 55 and 55a (arm 55a is not visible in FIG. 3; is visible in FIG. 1) which support an idling roller 70, a guide pin 62 and two guide plates 63 and 64 (see FIG. 4), all of which guide composite ribbon 68 over roll 70 to the ribbon guiding and applying element, which in the preferred form of the invention shown comprises a barrel-shaped stitching wheel, or roller 50 rotatively mounted on a pin 64a which is mounted on the arms 47, 47a.

Figure 2:
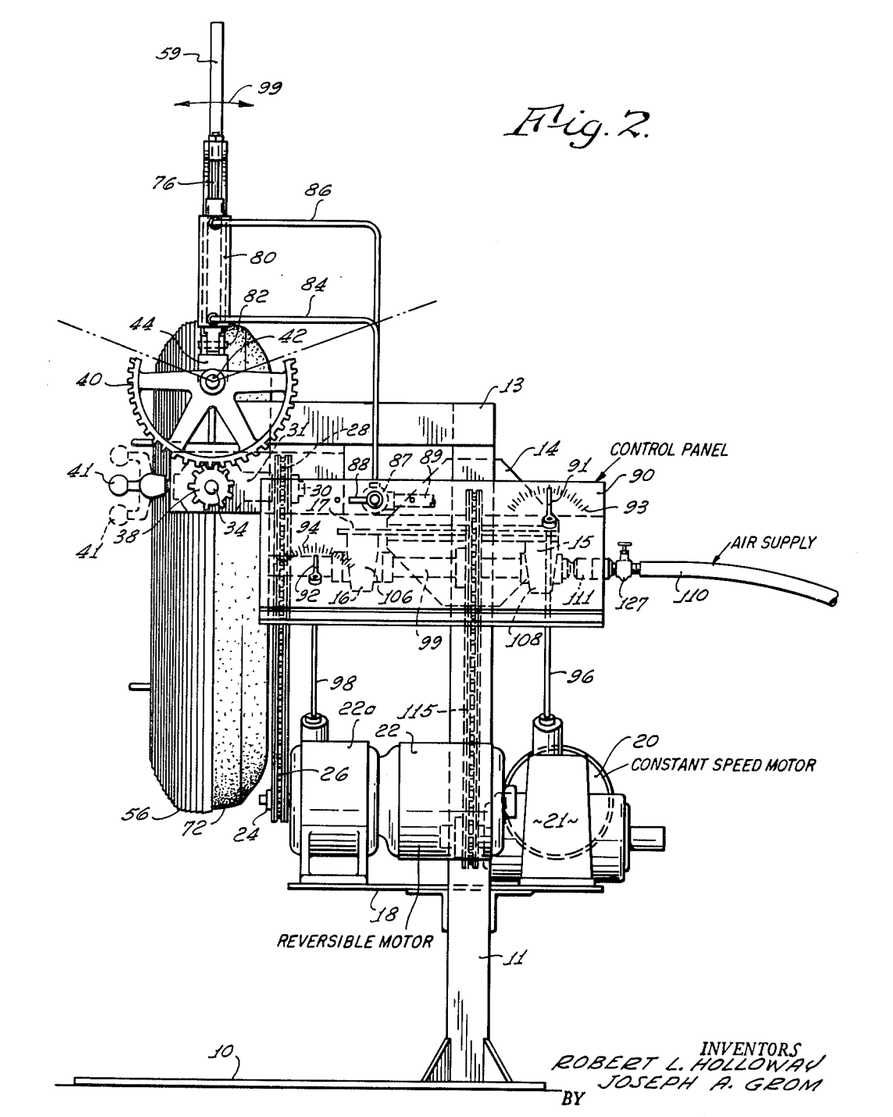
FIG. 2 is a front view of the machine.
Figure 3:
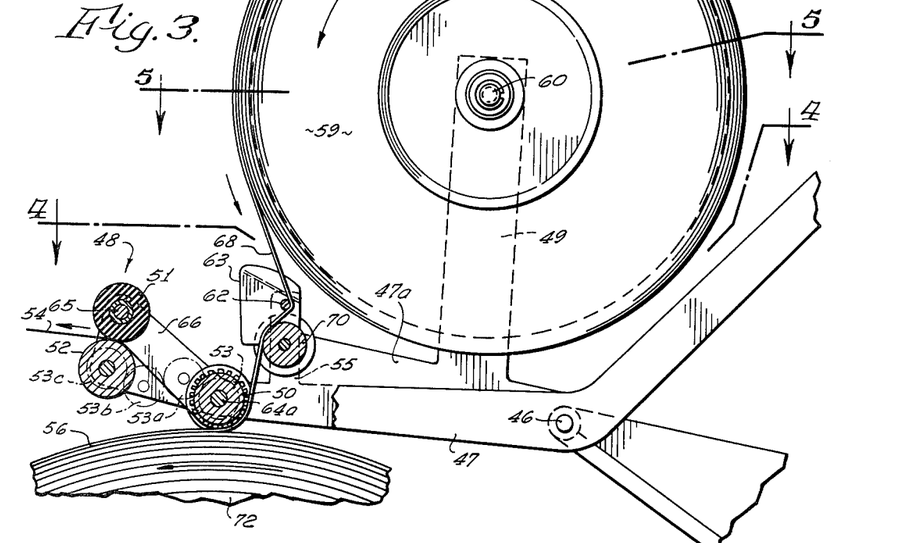
FIG. 3 is an enlarged side view of the ribbon guiding and stitching mechanism.
Figure 4:
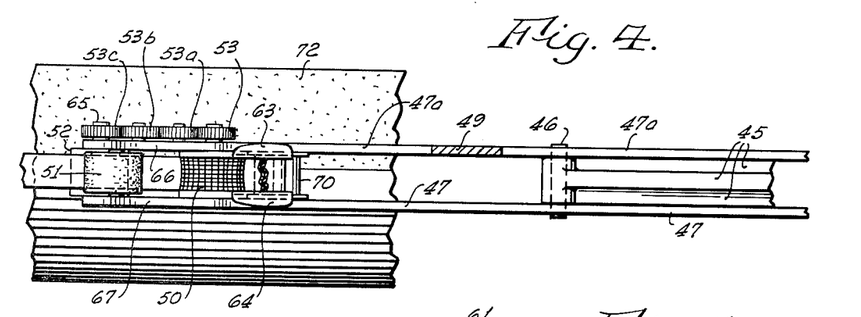
FIG. 4 is a plan view of FIG. 3 taken along line 4—4 illustrated in FIG. 3.

As best seen in FIGS. 1 and 2 compression roller 51, preferably metal, is mounted rotatively on pin 65, supported in two side-plates 66, 67 which constitute the two extensions of the guide arms 47, 47a. The roller 50 is geared to roller 52 through gears 53, 53a, 53b and 53c and is driven by roller 50. Compression roller 51 is driven through its frictional engagement with backing 54 as it is pulled between rollers 51 and 52. Rollers 51, 52 are used for stripping backing 54 from composite ribbon 68 and for feeding it to a suitable disposal receptacle (not shown).

It is desirable to maintain a uniform pressure exerted by roller 50 on tire 72. To achieve this, the outer ends of the guide arms 47, 47a are connected through studs 74 to a piston rod 76 which is connected to a piston 78 mounted in a swinging cylinder 80 connected to bracket 44 by means of a pin 82. Cylinder 80 is also connected to a source of fluid under pressure, such as compressed air, by means of hoses 84, 86. Hoses 84, 86 are connected to a manually operated valve 87 (see FIG. 2) having a handle 88. Valve 87 is a four-way valve which alternately supplies compressed air either to the upper or lower portion of cylinder 80 for moving assembly 48 into its operative position shown in FIGS. 1 and 3, and holding it there, and for returning it to its inoperative position (not shown) upon completion of winding operations. Valve 87 is connected to hoses 84 and 86, and pipe 89 is connected to a pressure regulator (not shown) and a source of compressed air. Valve 87 is mounted on panel 90. Since cylinder 80 is connected to the source of compressed air through the pressure regulator, constant pressure is exerted by piston 78 on the stitching roller 50 and on ribbon 56 as it is being applied to tire 72 irrespective of the angular positions of the guide arms 47, 47a.

Besides valve 87 and its control handle 88, the control panel 90 also includes a manually operated speed control arm 92. Panel 90 is also provided with an angular scale 94 for indicating the angular position of arm 92. Arm 92 is connected to a control rod 98 which is used to control the speed of the angular travel of the stitching apparatus around its axis and shaft 42 by varying the speed of rotation of motor 22 which drives the sector gear 40 and therefore, through this sector gear, rotates or oscillates the entire reel assembly A in the manner indicated by an arrow 99 in FIG. 2. When gears 208, 209 (FIG. 2a) are disengaged, assembly A is held in fixed position and is prevented by the drag clutch interposed between the frame member 37 and shaft 34. This clutch includes a friction disk 210, clutch plate 211 (FIG. 2a) which is keyed to shaft 34 but movable axially and a Belleville spring 212 which pressurizes this assembly.

Referring now to motor 20 and its connections, this motor is used for driving the tire supporting wheel 120. Wheel 120 is mounted on an axle 99 by means of five threaded studs 100–104 and hexagonal nuts illustrated in FIG. 1. Wheel 120 may be a modified automobile wheel having one of its flanges removable for quick mounting and demounting of tire 72. Axle 99 is mounted on two bearings 106, 108 supported by the frame members. Axle 99 is a hollow axle and its outer end is connected to an air hose 110 which supplies compressed air to the wheel and then to tire 72 through the wheel rim for inflating the tire and for keeping it under constant, regulated or controlled pressure during the ribbon-winding operation. A rotatable, air-tight joint 111 is inserted between the axle and the hose.

The machine is also provided with a replaceable reference template 144, shown in FIGURES 1 and 1a, which is mounted on the frame of the machine by means of a bracket 140. Three inner edges 141, 142 and 143 of template 144 define the desired contour of the tire after the completion of the winding operation, and are used by the operator as reference lines for gaging the profile and the thickness of the layer of new rubber which must be deposited on the buffed carcass so as to produce a tread of the desired thickness.

The operation of the machine is as follows:

Depending upon the wear to which the tire has been subjected prior to its buffing, the tire is buffed on a suitable buffer (not illustrated) either to the pattern or contour 904, 1001, or 1103 illustrated respectively in FIGS. 9, 10 and 11. Upon the completion of the buffing operation, the tire is transferred to the winding machine by mounting it on wheel 120 and then locking it in place by means of removable flange 125 (FIG. 1). The tire is then inflated by opening valve 127 (FIG. 2) which connects the tire to hose 110 which in turn is connected to the source of compressed air. The pressure that is used for inflating tire 72 at this stage is sufficient for stabilizing the position of the tire during the winding operation and for making the buffed surface sufficiently stable and rigid for obtaining proper stitching of ribbon 56 (FIGS. 3, 6) to the buffer surface.

After tire 72 has been mounted on wheel 120 and properly inflated, a coat of suitable adhesive, such as a conventional rubber cement, is applied to the buffed surface of the tire to make it tacky, whereupon one may proceed with the winding operation. It is essential for proper practicing of the method that ribbon 56 is capable of retaining its position on carcass 72 immediately upon its being applied, as by stitching, to the buffed surface by roller 50. It is only under such conditions that it becomes possible to obtain and maintain the integrity of the winding patterns, such as illustrated in FIGS. 15–24.

The appropriate template 144, whose size corresponds to the size of the tire being retreaded, is then mounted on bracket 140 in properly spaced position with respect to the buffed surface of the tire, thus indicating the thickness of the layer of new rubber which should be wound on the tire for obtaining the proper tread.

Figure 6:
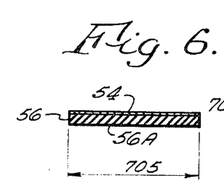
FIGS. 6 and 7 are enlarged transverse sections of the uncured rubber ribbon stock mounted on a backing.
Figure 7:
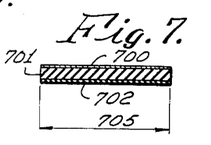

Examination of FIGS. 6, 7 reveals the fact that in FIG. 6 the composite ribbon includes backing 54, which may be polyethylene, and the rubber portion 56 which has a rectangular cross-section. In this instance, the rubber portion 56 itself must have a sufficiently tacky surface 56a so as to produce proper adherence of this ribbon during the applying and winding operation. One way to obtain such a tacky characteristic is to compound the rubber ribbon 56 by using a mixture of synthetic and natural rubber. A synthetic rubber that has good wearing characteristics at the present time is the so-called SBR rubber.

The widths 705 of the ribbons in FIGS. 6 and 7, and their thicknesses, are not critical although it obviously should be kept in mind that they should be of some suitable finite dimensions so as to produce proper stitching and permit practicing the patterns illustrated in the FIGS. 15–24. Very good results and convenient practicing of the method have been obtained in a width range of ribbon of from one-half inch to one and one-half inch, and preferably about one inch width and one-sixteenth inch thick when such a ribbon is used for retreading passenger car tires. The width and thickness of the ribbon will be described still further in connection with the description of FIG. 16. Here also the thickness can be somewhat greater, as shown in FIGS. 6 and 7.

Before proceeding with the description of the above patterns, however, the description of the remainder of the operation will be given here. After carcass 72 has been mounted on wheel 120 and properly inflated, roll 59 of the ribbon stock is mounted on reel 58, 57 and it is then properly threaded through the rollers 70, 50, 51 and 52. Rollers 51, 52 are used for separating the backing from the ribbon and, therefore, during this threading operation, the backing 54 (FIG. 3) is separated from ribbon 56 and threaded through rollers 51, 52 while the leading end of the rubber ribbon 56 is tacked onto the buffer surface of the tire at a point usually in the region shown by line 914 (FIG. 9) or in cases where tires have a beauty ring, to portions 1500 and 1501 of the tire, which is slightly above the beauty rings 1502 and 1503 (see FIGS. 15–19). These portions 1500 and 1501 define the boundary circles or the circular junctions between the carcass 1504 and the new rubber that is wound on the carcass. After the lead end of the rubber ribbon is thus merely attached to the buffed edge 1501 (FIG. 15) of carcass 1504, one is ready to begin with the winding of the ribbon on the carcass in the manner indicated according to the patterns illustrated in FIGS. 15–24. Again, before describing these patterns, it may be stated in general that all of the above patterns are obtained by merely varying the angle and the rate of rotation of the tire stitching assembly around the axle 42 of this assembly. Motor 22 rotates wheel 120 and tire 72 at constant angular velocity and, therefore, at constant peripheral speed. Therefore, by varying the angular velocities such as those illustrated by arrows and lines 1505–1510 in FIG. 15, it becomes possible to deposit either a greater or a smaller amount of rubber in any given transverse plane. It is also possible to deposit either a greater or smaller amount of rubber in any given transverse plane by maintaining a constant angular velocity of the stitching mechanism around axle 42 of this assembly and at the same time varying the speed of tire rotation. This can be accomplished by having motor 22 rotate at a constant predetermined speed and varying the speed of motor 20.

Either drive arrangement would produce the desired end result. For the sake of clarity, the former arrangement wherein the speed of motor 22 is varied and motor 20 is run at a constant predetermined speed has been described in detail. If motor 20 is a variable speed motor, then its speed may be controlled by means of a control rod 96 and a manually operated lever arm 91 mounted adjacent to a scale 93 on panel 90.

In the example described below, applying assembly A is rotated around axle 42 and this is accomplished by manually operating the speed control arm 92 which in turn varies the angular velocity of axle 42, sector gear 40, and of the tire stitching assembly. Accordingly, the angular velocity of composite ribbon 68 is also varied and when this velocity is equal to zero, then the applied rubber ribbon pattern will comprise a circle positioned in one transverse plane with the layers of rubber being deposited on top of each other in one single transverse plane. When the angular velocity of the applying assembly and of composite ribbon 68 is uniform and is so adjusted as to produce a tight helical spiral of the type illustrated in FIG. 15, then all that will be necessary for producing the pattern of the type illustrated in FIG. 15 is periodically to reverse this motion of the applying assembly in a manner illustrated by the paths 1505–1510, such reversals taking place at progressively shorter periods of time so as to produce progressively narrower layers of rubber 1515–1518.

Figure 15:
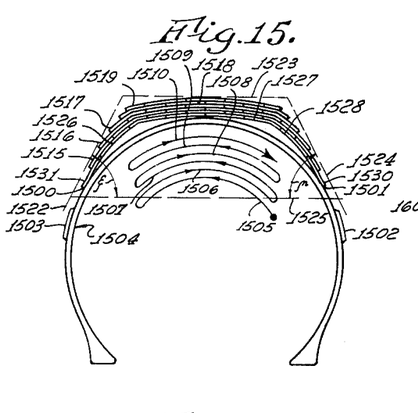
FIGS. 15–24 are a series of diagrammatic sectional representations of various patterns for applying the tape to the carcass of the tire.

It will be seen, therefore, that the winding pattern illustrated in FIG. 15 represents a series of superimposed, helical spirals which, in the transverse plane, span progressively decreasing angles of sectors so as to produce the symmetrical crown or tread outline roughly defined by lines 1522–1524 which, together with line 1525, define generally a symmetrical trapezoid with line 1525 being parallel to line 1523 and angle xi being equal to angle eta.

Figure 20:
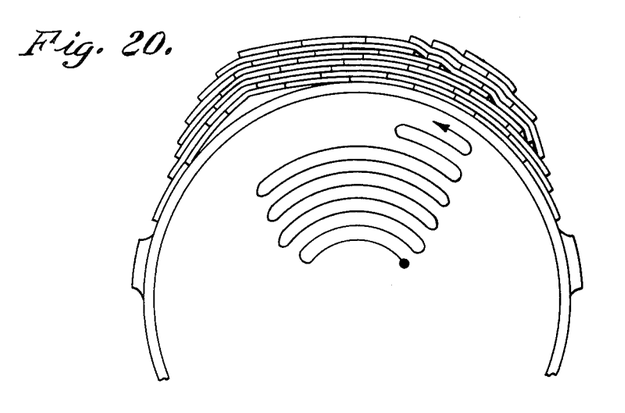

In FIG. 15, the original wear of the tire has been such that it was possible to buff this tire so as to follow a symmetrical pattern defined by the lines 1522–1524 of the previously mentioned trapezoid, the buffed surface being defined by the surfaces 1526–1528. In FIG. 20, however, an example is illustrated in which one corner or one edge of the tire was unevenly worn out. FIG. 20 illustrates the type of pattern that is capable of producing the final symmetric trapezoid defined by the same lines 1522–1524 by merely applying a larger number of turns or a larger number of layers of the ribbon to the asymmetrical portion of the carcass. This is accomplished by manually varying the angular velocities such as those which produce the paths of tire oscillation illustrated at 1505–1510 in FIG. 15. In order to make the junction point 1500 a true circle, which is desirable in order to have a substantially constant spacing between the newly applied retread and a predetermined point on the sidewall of a tire, for example, beauty ring 1503 on one side and equal and substantially constant spacing between a similar point on the opposite side of the tire, such as adjacent beauty ring 1502 and the junction circle 1501 on the opposite side of the same tire, it becomes necessary to have angular speeds equal to zero at the time ribbons 1530 and 1531 are applied to the carcass.

The winding and the pattern illustrated in FIGS. 15–20 are completed after the last turn of the helical spiral is obtained in the upper layer 1519 of the winding. At this point, the rotation of wheel 120 is stopped which stops the entire operation of the machine and also stops the operation of the stitch mechanism since the latter is operated through the frictional engagement between the outer periphery of the carcass and the stitching roller 50 of this mechanism. At this stage, the entire stitching mechanism is swung away from the tire by operating the air valve handle 88, whereupon the trailing end of the ribbon, which has been adhered, as by being stitched, to the last winding, is cut off from layer 59. This completes the winding operation. There now only remains to remove carcass 72 with the newly applied winding from wheel 120 and place it in a selected mold and the matrix in a manner illustrated in FIGS. 12–14 and cure in a conventional manner. The pattern produced in FIG. 15 is a variable pitch spiral.

It now only remains to describe the remaining patterns of the types of windings illustrated in FIGS. 16–24. Their nature should be apparent to the reader from the prior description of the machine and its operation, and, therefore, only a brief additional description should suffice.

Figure 16:
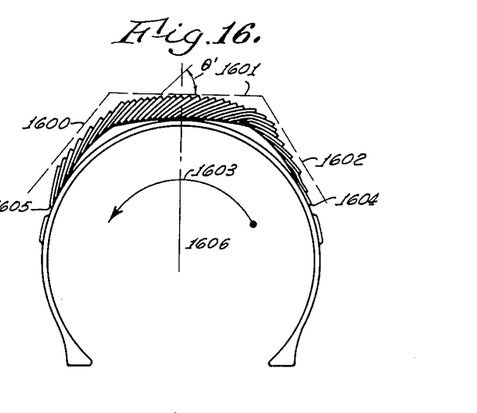

In FIG. 16 the proper trapezoidal locus 1600–1601–1602 is obtained by varying the angular velocity of the stitching apparatus as it travels along path 1603. One progresses with the winding from point 1604 to point 1605. When the velocity is reduced, then the angle subtended by the flat surface of the ribbon and the surface of the tire, such as angle $\theta'$, becomes either larger or smaller depending upon the magnitude of the angular velocity 1603, this angle being larger when this angular velocity is reduced and being smaller when this angular velocity is increased. In this manner, it becomes possible to obtain the variable pitch pattern illustrated in FIG. 16 merely by varying the angular, cross-feed velocity, the angle of inclination of the ribbon with respect to the buffed surface and the degree of overlap between each preceding and succeeding turn. Thus, in FIG. 16, no reversal of the directions of travel is necessary, which was the case in FIG. 15. Comparison of the pattern illustrated in FIG. 16 with that illustrated in FIG. 20 indicates that this type of winding and pattern is more flexible, control-wise, than that illustrated in FIG. 15 and from the point of view of obtaining the various outlines of the winding without the reversal of the directions of travel. Therefore, such patterns can be programmed either manually or automatically more readily and with a greater ease than the one illustrated in FIG. 15.

The dimensions of the ribbon which are suitable for practicing the method illustrated in FIG. 16 (and FIGS. 17, 18 and 19) follow from the examination of the pattern itself. First of all, the width of the ribbon should be greater than the maximum thickness of the tread so that it always would be possible to place the ribbon at an angle, such as $\angle \theta'$, even with respect to the central portion of the tread, or the central portion of the tire designated by an axis of symmetry 1606 in FIG. 16. This angle should be less than 90°, and preferably in the moderately acute range, which may be defined as between 40° to 70°, as shown in the drawings. This permits the convenient handling and natural following of the ribbon to obtain the variable pitch spiral, illustrated in FIG. 16, and natural superimposition of the succeeding layer over the preceding layer. This also produces excellent anchoring and adhesion of the flat surface of each succeeding turn to the flat surface of the preceding turn with the result that the entire winding produces a variable thickness layer of crude rubber on the surface to be retreaded, with this layer being integrated into a solid mass even before molding. As stated previously, for retreading passenger tires, the width of the ribbon may be in the order from .75 to 1.5 inches wide.

The thickness of the ribbon is a function of its width: The wider the ribbon, the thicker it should be in order to prevent buckling and deforming of the ribbon during the winding operation and placing it, in part, on edge in the manner illustrated in FIG. 16. Excellent results were obtained with one-inch ribbon (one inch wide) having a thickness in the order of one-eighth of an inch (3 mm.).

Figure 21:
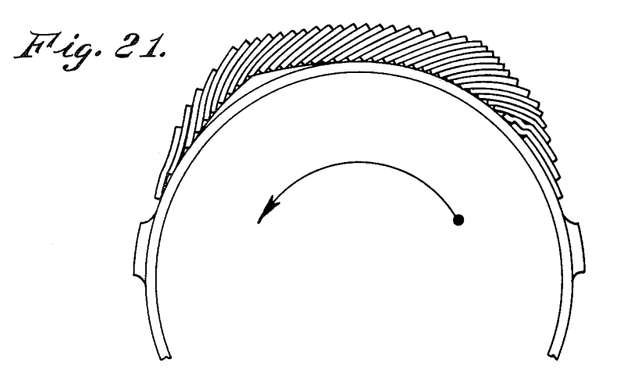

FIG. 21 illustrates the application of this type of winding and pattern to the asymmetrically buffed tire. One can very readily see that an asymmetric winding can be very readily obtained by means of such pattern by merely varying the magnitude of angle $\theta'$ illustrated in FIG. 16.

Figure 19:
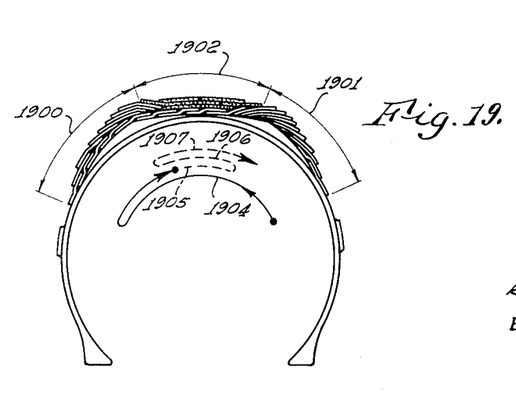
Figure 23:
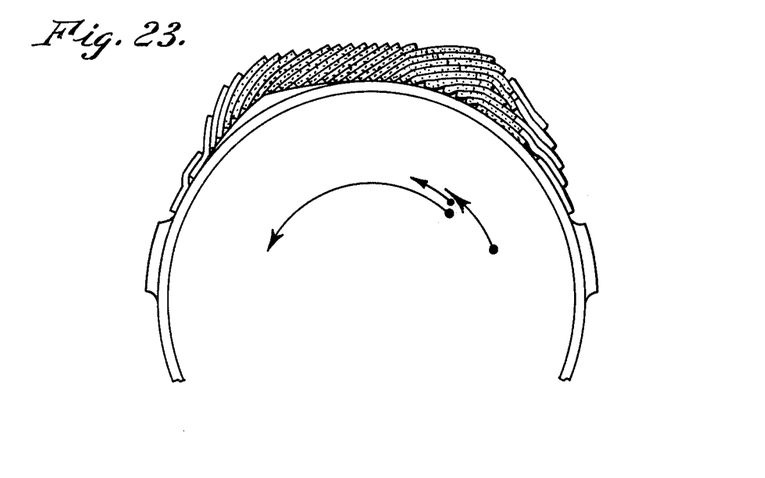

FIGS. 19 and 23 represent slight modifications of the techniques illustrated in FIGS. 16, 21. The modifications reside in that sector 1800 in FIG. 18 includes the winding having a non-skid winter tread rubber 1801 while the remaining sectors 1802, 1803 represent application of the conventional ribbon rubber. The so-called non-skid treads use rubber with foreign particles uniformly dispersed within rubber. The particles may be wood chips, walnut shells, silica, sand, cork granules, etc. which are known to the tire art. In order to obtain the pattern illustrated in FIGS. 18, 23, sector 1800 is applied first; sector 1802 is applied second; and sector 1803 is applied third in the manner previously described and or illustrated diagrammatically by the paths 1804 and 1805 respectively.

Figure 17:
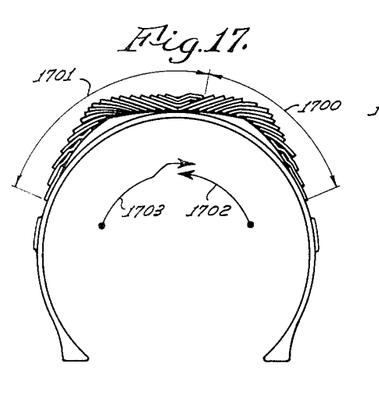
Figure 18:
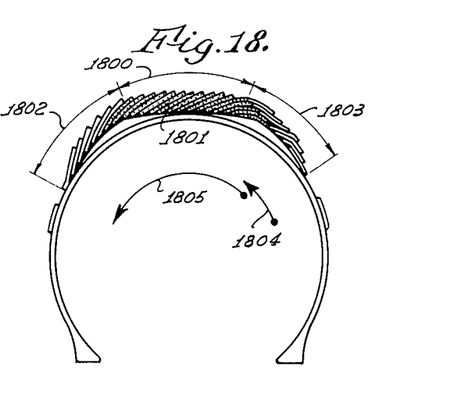
Figure 22:
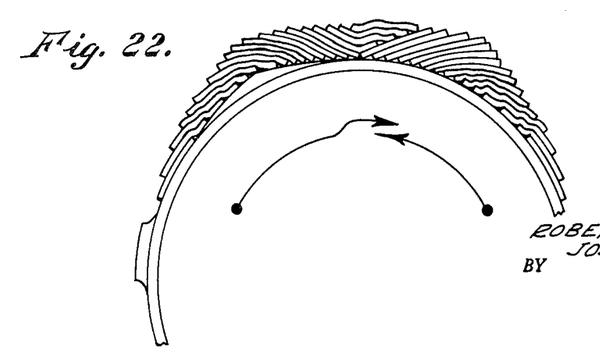

FIGS. 17, 22 constitute another modification of the pattern and the method disclosed in FIGS. 16, 21. In this case, sector 1700 is applied first and sector 1701 is applied second in the manner illustrated diagrammatically by the paths 1702, 1703. The left sector 1701 is slightly superimposed over the right sector 1700 at the mid-portion of the tire. The resulting pattern is self-explanatory in the light of the prior description of comparable patterns.

Figure 24:
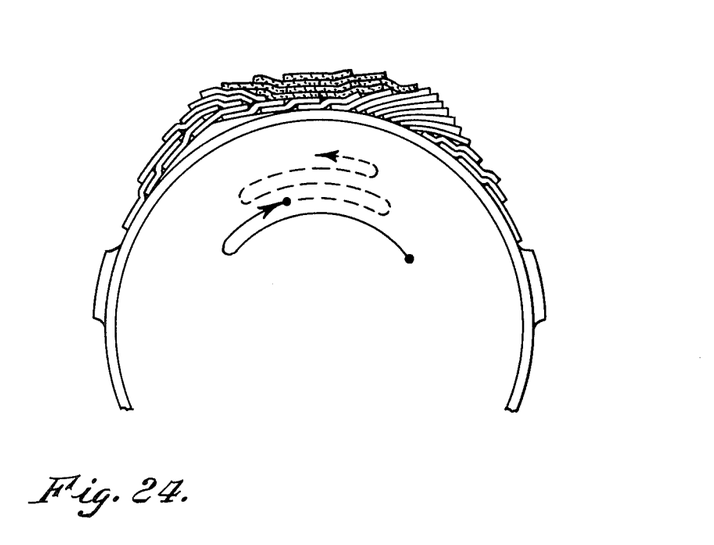

The pattern illustrated in FIGS. 19, 24 enables one to apply the various types of rubber compositions to the various sectors of the winding. The two outer sectors 1900 and 1901, illustrated in FIG. 19, are again composed of a conventional rubber while the central sector 1902 may be composed of the skid-resistant rubber of the type described in connection with FIGS. 18, 23. This skid-resisting portion 1903 of the winding is superimposed on top of the sectors 1900 and 1901. The winding pattern illustrated in FIGS. 19, 24 can also be obtained by following the velocity pattern, and the path, illustrated in 1904–1907. The velocity pattern 1904 produces that portion of the winding which is composed of the conventional rubber while the velocity pattern 1905 produces that remaining portion of the pattern which is composed of the central portion 1903 for which a skid-resistant rubber has been used in the illustrated example.

From the above description of the operation of the machine, it follows that a very rapid application of a variety of windings is possible, that either a symmetrical or asymmetric winding is obtainable, and that it is also possible to vary the overall thickness of the winding at any given point of this winding as one travels along a transverse arc subtended by the winding in the transverse plane. Accordingly, the geometry of the winding can be varied at will, so to speak, along the "X" as well as the "Y" axis (thickness and width) and such variations of the dimensions of the winding can be obtained at any point along the "X" axis and at any point along the "Y" axis. Accordingly, it is possible to obtain any number of transverse patterns, shapes, and dimensions with a ribbon which has only one width and one thickness. It thus becomes possible to obtain any variety of windings for different tire sizes. Accordingly, it also becomes possible to recap or retread a large variety of tires of different sizes and shapes from those used in the sports cars to those used in heavy trucks with a single size ribbon having fixed width and thickness, thus completely eliminating and solving the problem that is now present and besets the recappers who must carry a variety of shapes of camel-back stocks which are required for recapping the various sizes of tires.

It should be mentioned here that when one considers the recapping of unusually large special type tires, such as those used with the earth-moving equipment and some of the especially large airplane landing gear tires, it becomes desirable to enlarge the width as well as the thickness of the ribbon for facilitating the completion of the winding cycle in a reasonably short period of time. Tires of this type require the application of several hundred pounds of uncured rubber per tire and it is obvious that, under such circumstances, it becomes desirable to enlarge width and thickness of the ribbon. This may be compared to recapping of conventional tires such as those used in passenger cars requiring an application of only approximately eight to ten pounds of uncured rubber per tire.

Figure 5:
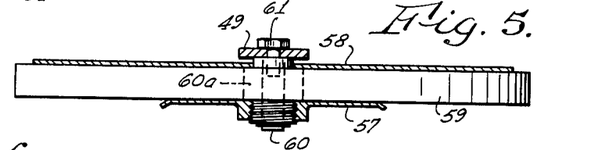
FIG. 5 is a sectional view of the ribbon roller, also illustrated in FIG. 3, the section being taken along line 5—5 shown in FIG. 3.
Figure 8:
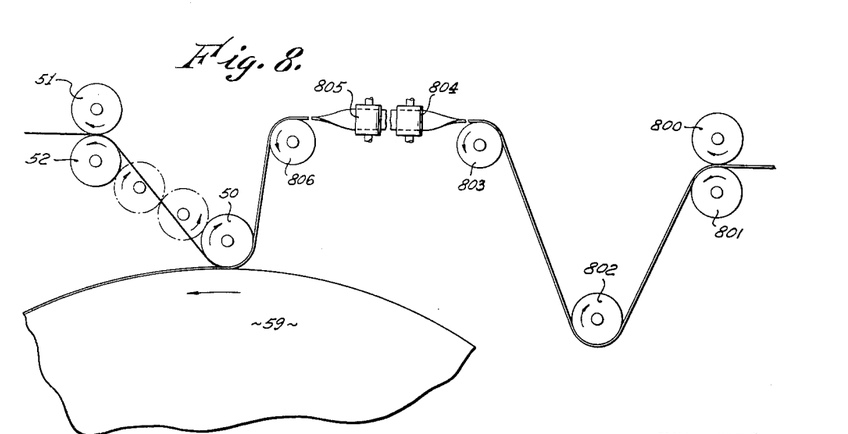
FIG. 8 is a side view of another version of the stitching apparatus.

In FIGS. 1 and 2, the ribbon stock is mounted on a reel 58–57–60 (FIG. 5). Only a limited amount of rubber stock can be mounted on a reel of this type. In a modified form of the invention, as shown in FIG. 8, the ribbon of rubber is fed from a suitable bulk source of supply (not shown) by feeding the couple 800, 801, and thence over idler rollers 802, 803, 804, 805 and 806 to applying, i.e. stitching roller 50. The operation of the machine provided with this type of feed from bulk supply is substantially the same as that described hereinabove in connection with the machine shown in FIGS. 1–5. It will be understood that roller 50 and guide rollers 805, 806 are mounted in an applying device similar to assembly A described heretofore. An advantage gained by this modified form of the invention is that several tires can be prepared for the molds and vulcanization of the tread without need for replenishing the supply.

The adaption of the present invention to the making of tires of original manufacture will be obvious to those skilled in the art. As is well known, the first step in building a tire is the construction of the carcass comprising a plurality of plies of rubber and rubberized cord material. This is normally accomplished on a cylindrical mandrel or drum resulting in a finished carcass having likewise a cylindrical shape. The cylindrical carcass is then provided with (1) a slab of rubbery material forming the tread and finished in toroidal shape or (2) the cylindrical carcass is first formed without a tread applied thereto into a semi-toroidal shape and the tread thereafter being adhered to it in much the same manner as previously described in the common retreading practice. Another not uncommon method of building a tire carcass is to wind the rubberized cord directly into the form of a toroid without employing the cylindrical mandrel method.

Either the cylindrical or toroid carcasses are specific forms of circular shapes and as such have similar requirements for applying the tread thereto; i.e., the tread must be of variable thickness, of defined width, and accurately positioned. The tread can either be applied as a single slab or built up by a plurality of layers of ribbon. In any event, the differences in shape present no difficulty to one skilled in the art and the apparatus described herein may be obviously employed without any substantial change.

What is claimed as new is:

1. A machine for winding on a pneumatic tire a composite ribbon of uncured rubber adhesively mounted on a backing, said ribbon being narrower than the tread portion of the tire, said machine including a frame, a hollow shaft rotatively mounted on said frame, means for rotating said shaft, a tire support on said shaft, a source of constant pressure connected to said hollow shaft for inflating and maintaining said tire inflated at constant pressure during the ribbon-winding cycle of said machine, a source of supply of composite ribbon, a ribbon feeding and applying mechanism, said feeding and applying mechanism having means for feeding said ribbon from said source of supply to said tire being wound, said feeding and applying mechanism having first means for adhering said composite ribbon to said tire, second means for peeling off said backing from the uncured rubber portion of said ribbon substantially concurrently with the adherence of said ribbon to said tire, and third means for oscillating said ribbon applying mechanism through a predetermined angular path of movement for applying a plurality of windings of said ribbon on a selected area of said tire from side to side and over the crown of said tire.

2. The machine as defined in claim 1 in which said first means for adhering said ribbon includes a stitching roller, a lever arm rotatively supporting said roller, a rotatable bracket supporting said lever arm, said lever arm and said bracket including pivot means for rotatively supporting said lever arm on said bracket, the axis of said pivot means being parallel to the axis of said hollow shaft, second pivot means for said bracket, the axis of said second pivot means being perpendicular to the axes of said hollow shaft and said first pivot means, and gear means connected to said bracket for rotating, or oscillating said bracket through said angle or sector.

3. The machine as defined in claim 1 which also includes an air cylinder, one end of said air cylinder being pivotally attached to said bracket, a piston in said cylinder, a push rod attached to said piston, a pivotal connection between said rod and said lever arm, and a source of regulated air pressure connected to said cylinder for applying constant pressure on said piston and, with the aid of said piston, on said lever arm and said stitching roller.

4. The machine as defined in claim 1 in which said first means for adhering said ribbon includes a pressure roller, means for applying substantially constant pressure to said roller, said roller being driven by said tire in response to the rotation of said tire and the frictional and pressurized engagement between said roller and the ribbon-receiving surface of said tire through the ribbon which is being adhered to said surface, and said second means for peeling off said backing includes a pair of feeding and stripping rollers for stripping said backing from said ribbon of rubber adhered by said presser roller to said surface, and means for driving at least one of said feeding and stripping rollers.

5. The machine as defined in claim 1 in which said third means for oscillating said ribbon feeding and applying mechanism includes a variable speed drive, means varying the speed of said drive, and means for reversing the direction of said drive.

6. The machine as defined in claim 1 including a reel for mounting said ribbon, and support means on said feeding and applying mechanism for said reel, whereby said reel and said mechanism oscillate together.

7. An apparatus for retreading a pneumatic tire comprising a support mounting a tire to be treaded, feeding means for supplying a continuous ribbon of adherent rubber onto the prepared surface of said tire including means for adhering said ribbon to said tire, means for winding said ribbon upon said surface, mechanism for effecting relative lateral displacement between said support and said feeding means during the operation of said winding means to apply a plurality of adjacent contiguous windings of said ribbon on the surface of said tire, said mechanism including driving means for effecting a generally arcuate path of travel between said support and said feeding means, means for continuing said winding until a predetermined quantity of ribbon has been disposed upon said surface, and means for selectively increasing or decreasing the movement of said driving means for depositing said ribbon in a variable pitch spiral with the adjacent turns of said spiral overlapping each other to the extent determined by the variation in the pitch of said spiral thereby increasing the amount of said rubber wound on selected portions of the surface of said tire.

8. The invention as defined in claim 7 including means for feeding said strip of rubber material and maintaining said strip substantially free from tension during the winding thereof on said tire.

9. The invention defined in claim 8 wherein said last named means comprises a presser ribbon stitching roller, a frame for supporting said stitching roller, means for pivotally mounting said frame, and means for maintaining a susbtantially constant pressure on said roller through said frame during the application of said strip of rubber material to said tire.

10. The machine as defined in claim 1 including a reference template, means for mounting said template adjacent to and partially straddling the periphery of said tire and transversely thereof, said template having a concave outline to match a convex outline of the normal, new retreaded oprtion of said tire, and said template having means for mounting said template in properly spaced relationship with respect to the buffed surface of said tire before the beginning of said winding of the ribbon, and acting as a guide means for applying the proper amount of said ribbon to said tire.

11. Apparatus for applying a variable thickness elastomeric layer on the outer surface of a tire casing, said outer surface including the sidewalls and a crown of said casing, said apparatus comprising an elastomeric ribbon having a width narrower than the width of the crown and greater than the maximum thickness of said elastomeric layer, means for supporting and rotating said casing about its central axis; a mechanism for applying said ribbon across the sidewalls and crown of said casing in a substantially helical spiral, said mechanism including means for feeding said ribbon with its width surface substantially opposed to said surface, pressure means for stitching said ribbon to said surface, means for relatively moving at a variable rate said mechanism in a plane transverse to the plane of said casing, and control means for varying said rate and the attitude of said stitching means with respect to said surface for selectively varying the degree of overlap between respective preceding and succeeding turns and the angle between the opposed surfaces of said ribbon and said casing, whereby said ribbon produces said variable thickness layer stitched to said surface.

12. The apparatus according to claim 11 including a reference guide defining the depth of the layer to be applied to said casing.

13. Apparatus for winding a continuous ribbon of elastomeric material on the surface of a substantially toroidal tire carcass, comprising a support for mounting said carcass about its central axis, motor means for rotating said carcass in a plane perpendicular to said axis, a source of said material including a support, feed means for drawing said ribbon from said support and stitching means for adhering said material to said carcass, at least said stitching means being movable to progress said ribbon in an arcuate path with respect to the surface of said carcass and lying in a plane transverse to the plane of rotation of said carcass, motor means for moving said stitching means along said path, and means for effecting the simultaneous rotation of said carcass and the movement of said stitching means including means for varying the transverse speed of said ribbon so as to vary the pitch of the winding on said carcass.

14. The apparatus according to claim 13 including control means for selectively increasing or decreasing the angular velocity of rotation of the carcass.

15. Apparatus for winding on the outer surface of a pneumatic tire casing a ribbon of elastomeric material narrower than the tread portion to be formed on said casing, said machine including a frame, a hollow shaft rotatively mounted on said frame, means for rotating said shaft, said tire casing being supported on said shaft, a source of constant pressure connected to said hollow shaft for inflating and maintaining said tire at a constant pressure during the ribbon-winding cycle of said machine, a source of supply of ribbon, a ribbon feed and applying mechanism, said feeding and applying mechanism having means for feeding said ribbon from said source of supply to said tire casing, a stitching roller for adhering said ribbon to said casing, a lever arm rotatively supporting said roller, a rotatable bracket supporting said lever arm, said lever arm and said bracket including pivot means for rotatively supporting said lever arm on said bracket, the axis of said pivot means being parallel to the axis of said hollow shaft, second pivot means for said bracket, the axis of said second pivot means being perpendicular to the axes of said hollow shaft and said first pivot means, and means including gear means connected to said bracket for oscillating said bracket through a predetermined angular path of movement for applying said ribbon on said outer surface of said tire casing.

16. The machine as defined in claim 15 which also includes an air cylinder, one end of said air cylinder being pivotally attached to said bracket, a piston in said cylinder, a push rod attached to said piston, a pivotal connection between said rod and said lever arm, and a source of regulated air pressure connected to said cylinder for applying constant pressure on said piston, and, with the aid of said piston, on said lever arm and said stitching roller.

17. Apparatus defined in claim 15 in which said means for oscillating said bracket includes a variable speed drive, means varying the speed of said drive, and means for reversing the direction of said drive.

18. The apparatus as defined in claim 15 including a reel for mounting said ribbon and support means on said feeding and applying mechanism for said reel, whereby said reel and said mechanism oscillate together.

19. The apparatus as defined in claim 15 including a reference template, means for mounting said template adjacent to and partially straddling the periphery of said casing and transversely thereof, and having means for adjustably spacing said template with respect to the surface of said casing before the beginning of said winding of the ribbon to define the depth of the layer to be deposited on said casing by winding said ribbon around the outer surface of said casing.

20. The machine as defined in claim 17 in which said reversing means includes a reversing gear cluster, a sector gear connected to said gear cluster, and a friction clutch interposed between the frame and sector gear for holding the bracket in place at the moment said sector gear is disconnected from said reversing gear cluster during the gear shifting of said gear cluster.

21. Apparatus for applying a variable thickness elastomeric layer on the outer surface of a tire carcass comprising a rotatable support for mounting said carcass, means for supplying elastomeric material in continuous ribbon form, a driving system for effecting relative rotary and transverse movements of said carcass and ribbon, said system including means for rotating said support about the central axis of said carcass and means for effecting transverse movement of said ribbon relative to said carcass during rotation thereof, thereby to wind the ribbon about the carcass, and control means for said system including means operable to increase and decrease selectively the amounts of said relative transverse movement during respective revolutions of the carcass without reversing the direction of said movement so that the winding progresses continuously from one side of the carcass to the other, whereby the degree of overlapping of successive convolutions is varied selectively to produce a tread of desired cross-section and thickness.

22. Apparatus for applying a variable thickness elastomeric layer on the outer surface of a tire carcass comprising a support for mounting said carcass, a source of elastomeric material, means for supplying said material as a continuous elastomeric ribbon, means for rotating said support to wind said ribbon about the outer surface of said carcass, means for effecting the movement of said carcass and ribbon transversely relative to each other during said winding, and control means for the last-mentioned means, said control means being operable to vary the amount of said relative movement between the carcass and ribbon during each successive revolution while the winding progresses continuously from one side of the carcass toward the other and without reversing the direction of said relative movement, thereby varying the degree of overlapping of successively wound convolutions to deposit said variable thickness elastomeric layer.

23. The machine as defined in claim 7 which also includes means for reversing the direction of rotation of said mechanism.

24. The machine as defined in claim 23 in which said reversing means includes a reversing gear cluster, a sector gear connected to said cluster, and a friction clutch interposed between the frame and sector gear for holding the applying mechanism in place at the moment said sector gear is disconnected from said reversing gear cluster during the gear-shifting of said gear cluster.

25. An apparatus for retreading a pneumatic tire comprising, in combination, a support rotatively mounting a tire to be retreaded, first motor means for rotating said tire at a substantially constant angular velocity, a source of supply of an uncured rubber ribbon, with the width of said ribbon being narrower than the width of a tread to be applied to said tire, but the width of said ribbon being larger than the thickness of said tread, and first means for applying said ribbon to that surface of the tire which is to be retreaded, said surface including two portions of the two sidewalls of said tire, said first means including a ribbon guiding and stitching roller, second motor means for moving said roller across the surface of said tire in an arcuate path lying in a transverse plane with respect to the plane of rotation of said tire to advance said ribbon first across one sidewall, then across the crown and then across the other sidewall of said tire, and control means for said second motor means to increase or decrease the speed of transverse movement of said roller, thereby applying said ribbon to the entire retread-receiving portion of said tire substantially in the form of a spiral with adjacent turns thereof having a variable degree of overlap.

26. Apparatus for applying a variable thickness elastomeric layer on the outer surface of a tire carcass, comprising a support for mounting said carcass: a source of elastomeric material, means for supplying said material as a continuous elastomeric ribbon narrower than said layer, means for feeding said ribbon to said carcass, means for progressively stitching said ribbon to said carcass, means for effecting the movement of said carcass and said ribbon relative to each other to wind said ribbon on said outer surface in a helical spiral, and variable speed control means operable under the control of an operator to increase and decrease the speed of said relative movement and thereby permit selectively variable overlapping of succeeding convolutions over preceding convolutions as winding progresses in a continuous single pass from one side of the carcass to the other, whereby said layer of variable thickness is deposited.

27. The apparatus as defined in claim 25 in which said ribbon includes a continuous backing strip, and said first means includes means for removing said backing from said ribbon only after said ribbon has been stitched to said tire.

References Cited by the Examiner
UNITED STATES PATENTS

| | | | |
|---|---|---|---|
| 1,335,879 | 4/1920 | Darrow | 156—405 |
| 2,121,252 | 6/1938 | Marco | 154—9 |
| 2,411,659 | 11/1946 | Manning | 156—29 |
| 2,849,049 | 8/1958 | Hanson | 154—14 |

EARL M. BERGERT, *Primary Examiner.*

ALEXANDER WYMAN, CARL F. KRAFFT,
*Examiners.*